United States Patent
Williamson

(10) Patent No.: US 8,914,418 B2
(45) Date of Patent: *Dec. 16, 2014

(54) FORESTS OF DIMENSION TREES

(75) Inventor: Eric J. Williamson, Faquay Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 929 days.

This patent is subject to a terminal disclaimer.

(21) Appl. No.: 12/325,235

(22) Filed: Nov. 30, 2008

(65) Prior Publication Data
US 2010/0138449 A1 Jun. 3, 2010

(51) Int. Cl.
*G06F 17/30* (2006.01)
*G06F 7/00* (2006.01)

(52) U.S. Cl.
CPC .... *G06F 17/30392* (2013.01); *G06F 17/30398* (2013.01)
USPC .......................................... 707/802

(58) Field of Classification Search
None
See application file for complete search history.

(56) References Cited

U.S. PATENT DOCUMENTS

| | | | |
|---|---|---|---|
| 5,657,437 A | 8/1997 | Bishop et al. |
| 5,819,273 A | 10/1998 | Vora et al. |
| 5,850,388 A | 12/1998 | Anderson et al. |
| 5,918,232 A | 6/1999 | Pouschine et al. |
| 6,092,050 A | 7/2000 | Lungren et al. |
| 6,377,287 B1 | 4/2002 | Hao et al. |
| 6,581,068 B1 | 6/2003 | Bensoussan et al. |
| 6,704,721 B1 | 3/2004 | Hellerstein |
| 6,775,675 B1 | 8/2004 | Nwabueze et al. |
| 6,993,533 B1 | 1/2006 | Barnes et al. |
| 7,181,422 B1 | 2/2007 | Philip et al. |
| 7,181,438 B1 | 2/2007 | Szabo |
| 7,318,006 B2 | 1/2008 | You et al. |
| 7,433,885 B2 | 10/2008 | Jones |
| 7,441,197 B2 | 10/2008 | Tschiegg et al. |
| 7,571,182 B1 | 8/2009 | Eddy |
| 7,631,020 B1 | 12/2009 | Wei et al. |
| 7,639,609 B2 | 12/2009 | Bolt et al. |
| 7,698,349 B2 | 4/2010 | Hulen et al. |
| 7,800,613 B2 | 9/2010 | Hanrahan et al. |
| 7,801,929 B2 | 9/2010 | Williamson |
| 8,019,679 B2 | 9/2011 | Bennett et al. |
| 8,099,383 B2 | 1/2012 | Naibo et al. |
| 8,150,879 B2 | 4/2012 | Williamson |

(Continued)

OTHER PUBLICATIONS

Adam Shapiro, "Analysis Services: Choosing Dimension Types in SQL Server 2000 Analysis Services", Jul. 19, 2001, technet.microsoft.com.*
Red Hat Notice of Allowance for U.S. Appl. No. 12/074,035, mailed on May 24, 2010.
Red Hat Office Action for U.S. Appl. No. 12/156,309, mailed on Jun. 23, 2011.

(Continued)

*Primary Examiner* — Usmaan Saeed
*Assistant Examiner* — Yu Zhao
(74) *Attorney, Agent, or Firm* — Lowenstein Sandler LLP

(57) ABSTRACT

A method and apparatus for managing forests of dimension trees. The method may include receiving user input identifying a dimension tree, and presenting the dimension tree to the user. The dimension tree includes a core dimension and a set of non-core dimensions. The method may further include receiving a user request to link a selected one of the non-core dimensions to non-core dimensions from other dimensions trees, displaying a list of available dimensions from existing dimension trees, and receiving a user selection of non-core dimensions from the list. Based on the user selection of non-core dimensions, a list of linked non-core dimensions from various dimension trees is created, and corresponding linkage information is stored in a database.

20 Claims, 10 Drawing Sheets

(56) References Cited

U.S. PATENT DOCUMENTS

| | | | |
|---|---|---|---|
| 8,204,809 | B1 | 6/2012 | Wise |
| 2001/0054034 | A1 | 12/2001 | Arning et al. |
| 2002/0016771 | A1 | 2/2002 | Carothers et al. |
| 2002/0183965 | A1 | 12/2002 | Gogolak |
| 2003/0101067 | A1 | 5/2003 | Duran et al. |
| 2003/0187716 | A1* | 10/2003 | Lee .................................. 705/10 |
| 2003/0217074 | A1* | 11/2003 | Wallace ..................... 707/104.1 |
| 2004/0122844 | A1 | 6/2004 | Malloy et al. |
| 2004/0153435 | A1* | 8/2004 | Gudbjartsson et al. ........... 707/1 |
| 2005/0044079 | A1 | 2/2005 | Abineri et al. |
| 2005/0080802 | A1 | 4/2005 | Cras et al. |
| 2005/0091206 | A1 | 4/2005 | Koukerdjinian et al. |
| 2005/0192963 | A1 | 9/2005 | Tschiegg et al. |
| 2006/0004830 | A1 | 1/2006 | Lora et al. |
| 2006/0031110 | A1 | 2/2006 | Benbassat et al. |
| 2006/0031209 | A1 | 2/2006 | Ahlberg |
| 2006/0111874 | A1 | 5/2006 | Curtis et al. |
| 2006/0112070 | A1 | 5/2006 | Ramos |
| 2006/0156967 | A1 | 7/2006 | You et al. |
| 2006/0245470 | A1 | 11/2006 | Balachandran et al. |
| 2006/0271884 | A1 | 11/2006 | Hurst |
| 2006/0282474 | A1 | 12/2006 | MacKinnon, Jr. |
| 2007/0055596 | A1 | 3/2007 | Yankovich et al. |
| 2007/0129997 | A1 | 6/2007 | Davies |
| 2007/0150862 | A1 | 6/2007 | Naibo et al. |
| 2007/0156677 | A1 | 7/2007 | Szabo |
| 2007/0156718 | A1 | 7/2007 | Hossfeld et al. |
| 2007/0192143 | A1 | 8/2007 | Krishnan et al. |
| 2007/0192724 | A1 | 8/2007 | Devore et al. |
| 2007/0219972 | A1 | 9/2007 | Cragun et al. |
| 2007/0250466 | A1 | 10/2007 | Imrapur et al. |
| 2007/0255574 | A1 | 11/2007 | Polo-Malouvier et al. |
| 2007/0255681 | A1 | 11/2007 | Tien et al. |
| 2007/0282673 | A1 | 12/2007 | Nagpal et al. |
| 2007/0291757 | A1 | 12/2007 | Dobson et al. |
| 2008/0033587 | A1 | 2/2008 | Kurita et al. |
| 2008/0040309 | A1 | 2/2008 | Aldridge |
| 2008/0086716 | A1 | 4/2008 | Devore et al. |
| 2008/0133568 | A1 | 6/2008 | Grosset et al. |
| 2008/0133582 | A1 | 6/2008 | Andersch et al. |
| 2008/0175478 | A1 | 7/2008 | Wentland et al. |
| 2008/0248875 | A1 | 10/2008 | Beatty |
| 2008/0294996 | A1 | 11/2008 | Hunt et al. |
| 2008/0306784 | A1 | 12/2008 | Rajkumar et al. |
| 2008/0307430 | A1 | 12/2008 | Friedlander et al. |
| 2009/0006455 | A1 | 1/2009 | Carroll |
| 2009/0012983 | A1 | 1/2009 | Senneville et al. |
| 2009/0055467 | A1 | 2/2009 | Petersen |
| 2009/0171606 | A1 | 7/2009 | Murata et al. |
| 2009/0234710 | A1 | 9/2009 | Belgaied |
| 2009/0259501 | A1 | 10/2009 | Poissant |
| 2009/0300533 | A1 | 12/2009 | Williamson |
| 2010/0057684 | A1 | 3/2010 | Williamson |
| 2010/0057756 | A1 | 3/2010 | Williamson |
| 2010/0057764 | A1 | 3/2010 | Williamson |
| 2010/0125813 | A1* | 5/2010 | Choudhury ................... 715/853 |

OTHER PUBLICATIONS

Red Hat Office Action for U.S. Appl. No. 12/156,309, mailed on Nov. 30, 2011.
Red Hat Office Action for U.S. Appl. No. 12/202,087, mailed on Mar. 15, 2011.
Red Hat Office Action for U.S. Appl. No. 12/202,087, mailed on Aug. 31, 2011.
Red Hat Office Action for U.S. Appl. No. 12/202,085, mailed on Jan. 3, 2011.
Red Hat Office Action for U.S. Appl. No. 12/202,085, mailed on Jul. 18, 2011.
Red Hat Notice of Allowance for U.S. Appl. No. 12/202,085, mailed on Sep. 27, 2011.
Red Hat Office Action for U.S. Appl. No. 12/202,077, mailed on Feb. 17, 2011.
Red Hat Office Action for U.S. Appl. No. 12/202,077, mailed on Aug. 3, 2011.
Red Hat Notice of Allowance for U.S. Appl. No. 12/202,077, mailed on Nov. 25, 2011.
Red Hat Notice of Allowance for U.S. Appl. No. 12/202,085, mailed on May 10, 2012.
Microsoft SQL Server 2005, "Mining SQL Server 2005 Data Mining Add-Ins for Office 2007," 2007, 11 pages, accessed onlne at <http://www.sqlserverdatamining.com/ssdm/Home/DataMiningAddinsLaunch/tabid/69/Default.aspx> on Sep. 22, 2011.
Red Hat Notice of Allowance for U.S. Appl. No. 12/202,085, mailed on Oct. 24, 2012.
Red Hat Office Action for U.S. Appl. No. 12/202,085, mailed on May 10, 2012.
Red Hat Office Action for U.S. Appl. No. 12/202,085, mailed on Oct. 24, 2012.
Red Hat Notice of Allowance for U.S. Appl. No. 12/202,085, mailed on Jul. 12, 2013.
IBM, Statistical Functions, 2 pages, copyright 1989-2011, accessed online at <http://publib.boulder.ibm.com/infocenter/spssstat/v20r0m0/index.jsp?topic=°/02Fcom.ibm.spss.statistics.help°/02syntransformation_expressions_statistical Junctions.htm> on Jul. 10, 2013.
Robinson, M., "Developing Report Navigation and Drilldown", SQL Server 2005, Aug. 2006, 13 pages, accessed online at <http://msdn.microsoft.com/en-us/library/aa964132(d=printer,v=sql.90).aspx> on Jul. 10, 2013.
Report Studio User Guide 10.1.0, "Using Drill-Through Access", IBM, last updated Oct. 20, 2010, 3 pages, accessed online at <http://pic.dhe.ibm.com/infocenter/cbi/v10r1m0/index.jsp?topic=°/02Fcom.ibm.swg.im.cognos.ug_cr_rptstd.10.1.0.doe/o2Fug_cr_rptstd_id28247cr_rptstd_modrep_drill_through_acce.html> on Jul. 10, 2013.
Shapiro, A., "Analysis Services: Choosing Dimension Types in SQL Server 2000 Analysis Services", SQL Server 2000, Jul. 2000, 23 pages, accessed online at <http://msdn.microsoft.com/en-us/library/aa902636(d=printer,v=sql.80).aspx> on Jul. 10, 2013.

* cited by examiner

FORESTS OF DIMENSION TREES

RELATED APPLICATIONS

This application is related to U.S. patent application Ser. No. 12/074,035, filed on Feb. 29, 2008, Ser. No. 12/156,309, filed on Aug. 29, 2008, Ser. No. 12/202,087, filed on Aug. 29, 2008, Ser. No. 12/202,085, filed on Aug. 29, 2008, and Ser. No. 12/202,077, filed on Aug. 29, 2008 respectively, and assigned to the assignee of the present application and hereby incorporated by reference.

TECHNICAL FIELD

Embodiments of the present invention relate to data warehousing, and more specifically, to managing forests of dimension trees.

BACKGROUND

Data stored in a database is usually transactional in nature. A database may be a transactional database or a relational database. Transactional databases simply are a collection of transaction tables. Relational databases add the capacity to match tables together and perform other functions. Since relational databases provide ways to match and organize data, more insight can be achieved through them. Hence, most databases systems by default are relational (encompassing the transactional as well as relational capacity). These databases are intended to contain data in a format that will allow it to be completely matchable with other data in the database or other outside databases. However, this data is not organized in a manner where the natural relationships become apparent or easily utilized. Rather, the relationships in the data are defined and maintained by the application running on top of the database. An individual can only see the relationships in the data if he or she already has an understanding of the database structure and the application functionality.

Database administrators (DBAs) are often faced with the above limitation of data storage when performing data warehousing using conventional ETL tools. An ETL tool extracts data from outside sources, transforms the extracted data to fit business needs, and loads the resulting data into a data warehouse, which may then be used for reporting and analysis. ETL uses a technique known as On-Line Analytical Processing (OLAP). OLAP provides a capability for copying data from a production (application driven) database into separate OLAP tables. While a production database tends to store the data in many small tables with few columns, OLAP tends to shift the production data into fewer, larger tables with many columns.

OLAP uses dimensions that represent relationship descriptors, categories or drivers. Examples of dimensions may include Time, Location, Product, Industry, Account, etc. Dimensions can be organized into "cubes". A cube contains dimensions and a snippet of data (typically a number) which are reflected by the intersection of dimension selections. There are currently three main OLAP cube systems: ROLAP, in which the cube is virtual, calculated on the fly from the OLAP tables themselves; MOLAP, a literal cube of just dimensions and the intersection data stored separately from, or inside an OLAP table or in the computers RAM memory; and HOLAP, which is a hybrid of ROLAP and MOLAP.

The cube system has helped to fill some of the gaps between relational databases and the natural relationships of data. However, cubes also have weaknesses. The cube system is still a relational system with perfectly matchable data. In fact, the cube system is even more so because the cube treats each dimension equally. The natural relationships of data can still be expressed, but typically through many small cubes with different dimensions to capture the relationship. The second weakness of a cube system is that since cubes utilize intersections, dimensions need to be few and small or the process can create unwieldy cubes with many empty spaces (a cube can contain all possible dimension intersections, even if the data does not exist). Therefore cubes tend to eliminate details that may be important, but inexpressible in that format. Further, OLAP dimensions are not easily organized, nor are they easily matched across databases. Dimensions may contain the same theme (like "time") but because the elements are different, joining dimensions together are difficult because they are not naturally defined in the database. Moreover, OLAP-based ETL tools cannot effectively respond to reporting needs, such as ad-hoc drill-down requests, because these ETL tools cannot differentiate between high level and low level data.

BRIEF DESCRIPTION OF THE DRAWINGS

The present invention is illustrated by way of example, and not by way of limitation, in the figures of the accompanying drawings and in which.

DETAILED DESCRIPTION

Figure 1:
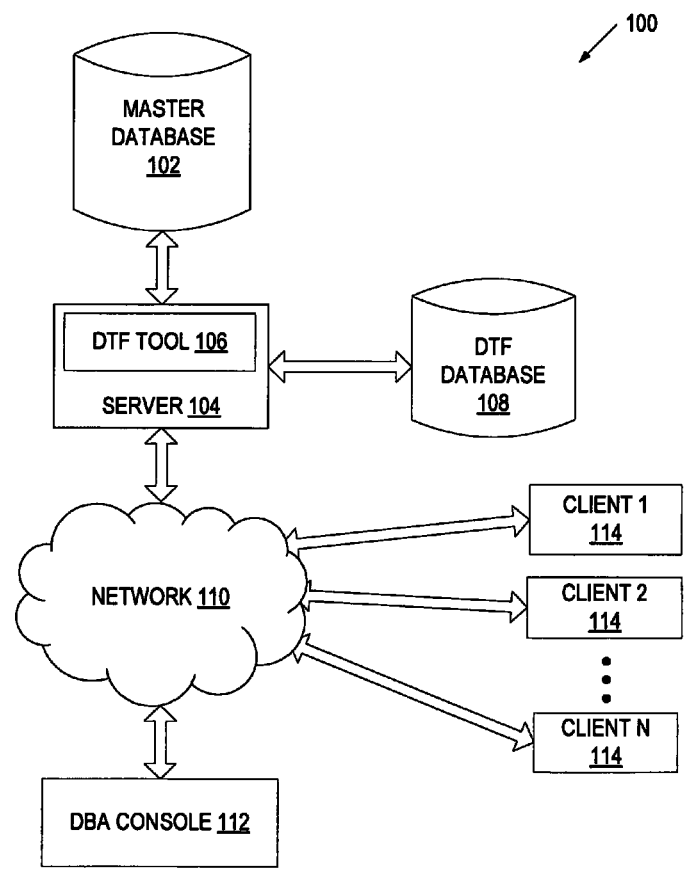
FIG. 1 illustrates a network architecture in which embodiments of the present invention may be implemented.

Described herein is a method and apparatus for managing forests of dimension trees. In one embodiment, in response to a user selection of a dimension tree, the dimension tree is presented to the user, where the dimension tree includes a core dimension and a set of non-core dimensions. The user may then select one of the non-core dimensions and request to link this dimension to non-core dimensions from other dimension trees. In response to this request, the user is presented with a list of available dimensions from existing dimension trees. Once the user specifies which of the available dimensions should be linked to the original non-core dimension, a list of linked non-core dimensions from various dimension trees is created, and corresponding linkage information is stored in a database.

As a result, different dimension trees become tied together via respective non-core dimensions, creating a forest of dimension trees. Linkage between non-core dimensions creates relationships that are not easily discernible from conventional databases. This allows for more complete and simplified reporting that can now be done by end users with no knowledge of database query languages (e.g., SQL) and no access to database querying tools.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include client devices (clients) 114, a server 104, a DBA console 112, and a network 110. The clients 114 may be, for example, personal computers (PCs), mobile phones, palm-sized computing devices, personal digital assistants (PDAs), and the like.

The server 104 may be, for example, a server computer, a PC, or any other machine. The server 104 may be coupled to the clients 114 via the network 110, which may be a public network (e.g., Internet) or a private network (e.g., Ethernet, a Local Area Network (LAN), or a corporate intranet). In addition, the server 104 may be coupled to a console 112 via the network 110. The console 112 may be operated by a DBA and may be, for example, a PC, a PDA, a mobile phone, etc. The console 112 may contain hardware components and software components including a browser application to render data provided by the server 104.

The server 104 may be coupled to a master database 102 which may reside on one or more storage devices. The server 104 may access the master database 102 directly or via a network (e.g., a private or public network). The master database 102 may represent one or more production databases of an organization or multiple organizations. A production database may be a large relational or transactional database.

The server 104 may host a tool 106 for managing forests of dimension trees (dimension tree forest (DTF) tool). The DTF tool 106 transforms data from the master database 102 to be more suitable for analysis and reporting and stores the transformed data in a central DTF database 108. The central DTF database 108 may reside on one or more storage devices and may be accessible to the DTF tool 106 via a network (private or public network) or directly. The DTF tool 106 provides graphical user interfaces (GUIs) to assist a DBA operating the console 112 in populating the DTF database 108. In addition the DTF tool 106 provides GUIs for users of the clients 114 to access the DTF database 108, view the transformed data, and create reports based on the transformed data.

The DTF database 108 is populated using natural relationships of data stored in the master database 102 and the joining power inherent in the relational features of the master database 102. In particular, the DTF database 108 is populated using dimensions and dimension trees. Dimensions are defined from data fields of the master database 102. Dimensions can then be organized into dimension trees. A dimension tree combines individual dimensions that are related to each other (e.g., dimensions "customer name," "customer's line of business" and "customer's contact person" may be combined into a tree "customer"). In addition, a dimension tree may combine individual dimensions with some other dimension trees or dimensions (e.g., a dimension tree "customer" may be combined with dimensions "address," "city," "state," "zip code," "telephone number" and "fax number"). A constituent dimension tree added to a main dimension tree is referred to herein as a sub-tree. A dimension tree may include a core dimension that signifies the purpose of the tree and some additional ("non-core") dimensions that relate to the core dimension and further characterize the core dimension. For example, the dimension tree "customer" includes a core dimension "customer name" and non-core dimensions "customer line of business," "customer state," etc.

In one embodiment, the DTF tool 106 allows a DBA to link non-core dimensions from different dimension trees, thus combining dimension trees into forests of dimension trees. Linkage between non-core dimensions from different dimension trees creates relationships that are not easily discernible from conventional databases, allowing for more complete and simplified reporting. For example, linkage between non-core dimension "state" from the dimension tree "customer" and non-core dimension "region" from the dimension tree "sales team" may allow an end user to determine a correspondence between the states in which sales were made and the states of the customers. This correspondence may help the end user to decide how many sales people should be allocated in each state. In another example, linkage between non-core dimension "location" from the dimension tree "vendor" and non-core dimension "address" from the dimension tree "distribution center" may allow an end user to decide what delivery carriers to use for each vendor.

In one embodiment, the DTF tool 106 also allows the DBA to create new non-core dimensions and link them to the existing non-core dimensions. Further, the DBA may merge linked non-core dimensions, create dimension trees from linked non-core dimensions, or perform any other manipulations of linked non-core dimensions. The above operations do not change data from the master database 102 but rather define new mappings for the data from the master database 102.

In one embodiment, the DTF database 108 defines the relationships between the dimension trees using a pyramid model, where the top of the pyramid contains only a few dimension tree roots and the base of the pyramid contains the largest number of dimension tree leaves. The DTF database 108 includes a separate table for each level of the pyramid. As a result, analysis or reporting can start at the top of the pyramid and drill down closer to the base of the pyramid. Alternatively, analysis or reporting can start at any level of the pyramid and move downward.

In some embodiments, an end user is allowed to choose a specific pyramid level, and be presented with dimension trees and dimensions (core and non-core) associated with this pyramid level. The user can then select a dimension tree for a report, and be presented with various predefined views of the dimension tree. The views organize dimensions and sub-trees inside a dimension tree in different ways based on multiple relationships a dimension or a sub-tree may have with other constituents of the dimension tree. For example, the tree "Customer" may be viewed based on systems within an organization that maintain data about customers (e.g., Sugar CRM, Oracle ERP, Datasoft system, etc.). Alternatively, the tree "Customer" may be viewed based on a customer status (e.g., future customer, current customer, inactive customer, et.). The views may be created by a DBA based on common reporting requirements of various users. The user can choose the view that is most suitable for the report being built, select dimensions and sub-trees from the view for relevant components of the report (e.g., title, parameters, column names, row names, etc.), and submit a request to populate the report.

In one embodiment, if the user cannot find a dimension tree or individual dimensions that satisfy his or her reporting needs, the user is allowed to build a custom dimension tree. In particular, the user may be allowed to select specific dimensions from the dimensions (e.g., linked non-core dimensions) or dimension trees created by the DBA, and see data elements of these dimensions. The resulting custom tree provides a custom hierarchy of the dimensions, without transforming the source data and its original structure. In addition, custom dimension trees allow new naming conventions and mapping to occur only for individual users, without changing dimensions and dimension trees maintained for the entire user community.

Figure 2:
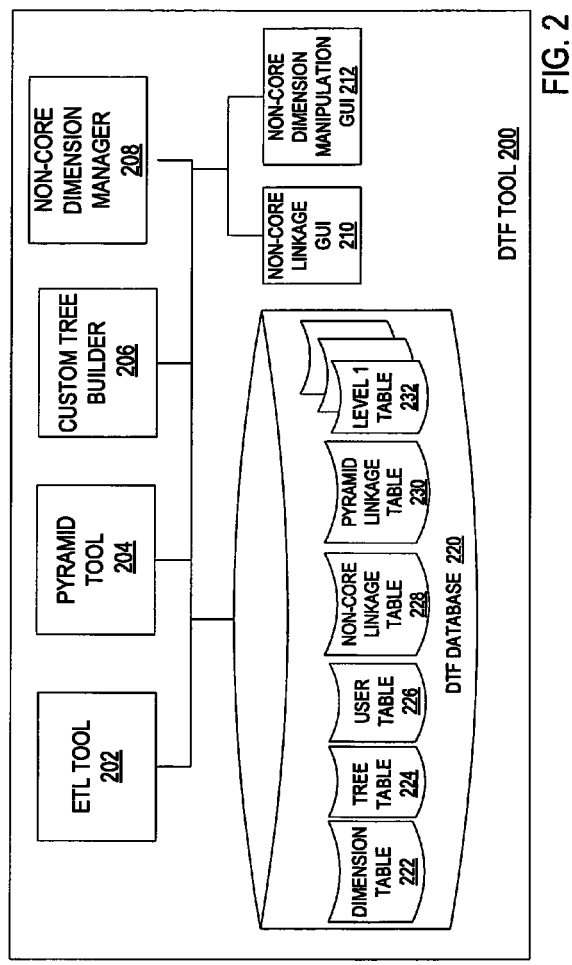
FIG. 2 illustrates a block diagram of one embodiment of a tool for managing forests of dimension trees.

FIG. 2 is a block diagram of one embodiment of a DTF tool 200. The server reporting system 200 may include an ETL (Extract, Transform, Load) tool 202, a pyramid tool 204, a custom tree builder 206, a non-core dimension manager 208, and a DTF database 220.

The ETL tool 202 transforms data from the master database to be more suitable for analysis and reporting and stores the transformed data in the DTF database 220. In particular, the ETL tool 202 provides user interfaces that allow a DBA to create dimensions from the production data fields and to define dimension trees based on the created dimensions. Based on the DBA input, the ETL tool 202 populates mapping tables of the DTF database 220 such as a dimension table 222 and a tree table 224. The dimension table 222 specifies dimensions created by the DBA and stores the mappings between the production data fields and the dimensions. The tree table 224 specifies information about dimension trees created by the DBA. This information may include, for example, the name of the dimension tree and identifiers of its constituents (e.g., dimensions, other dimension trees, and/or unique elements). In addition, the tree table 224 may specify views created by the DBA for each dimension tree (e.g., the name of the views and corresponding SQL statements).

The pyramid tool 204 creates a reporting pyramid based on user input and stores pyramid data in a pyramid linkage table 230 and a set of level tables 232. Each level table 232 corresponds to a specific level of the reporting pyramid and lists dimension trees and dimensions associated with this pyramid level. The pyramid linkage table 230 stores relationships between the tables 232. In addition, the pyramid tool 204 provides information about dimensions, dimension trees and views to end users that are creating a report. In particular, the pyramid tool 204 may receive from an end user a desired pyramid level for a report being built, and may return a list of dimension trees and/or dimensions associated with the desired pyramid level.

The custom tree builder 206 allows end users to build custom trees for individual users. In response to an end user request, the custom tree builder 206 may present a list of dimension trees and/or dimensions available at a desired pyramid level. When the end user selects some dimensions from the list, the custom tree builder 206 provides data elements of the selected dimensions, and allows the end user to create virtual dimensions and to map the data elements to the virtual dimensions. Based on this mapping, the custom tree builder 206 creates a custom dimension tree and stores information about the custom dimension tree in a user table 226. Specifically, the custom tree builder 206 may store the name of the custom dimension tree, the names of virtual dimensions, and the mapping between the data elements and the virtual dimensions.

The non-core dimension manager 208 provides a non-core dimension linkage GUI 210 that allows the DBA to link non-core dimensions from different dimension trees. The non-core dimension manager 208 stores the resulting linkage information in a non-core linkage table 228. Subsequently, if the DBA decides to "unlink" some of the non-core dimensions, the non-core dimension manager 208 updates the linkage information in the non-core linkage table 228. In addition, the non-core dimension manager 208 provides a non-core dimension manipulation GUI 212 that allows the DBA to manipulate non-core dimensions such as merging non-core dimensions, creating dimension trees or views from linked non-core dimensions, creating new non-core dimensions and linking new non-core dimensions to existing non-core dimensions, etc. Data identifying merged non-core dimensions, new non-core dimensions, and the created dimension trees and views are stored in the dimension table 222 and the tree table 224. Further, the non-core dimension manager 208 allows an end user to create custom views of non-core dimensions and stores this data in the user table 226 for use by the individual user.

Figure 3:
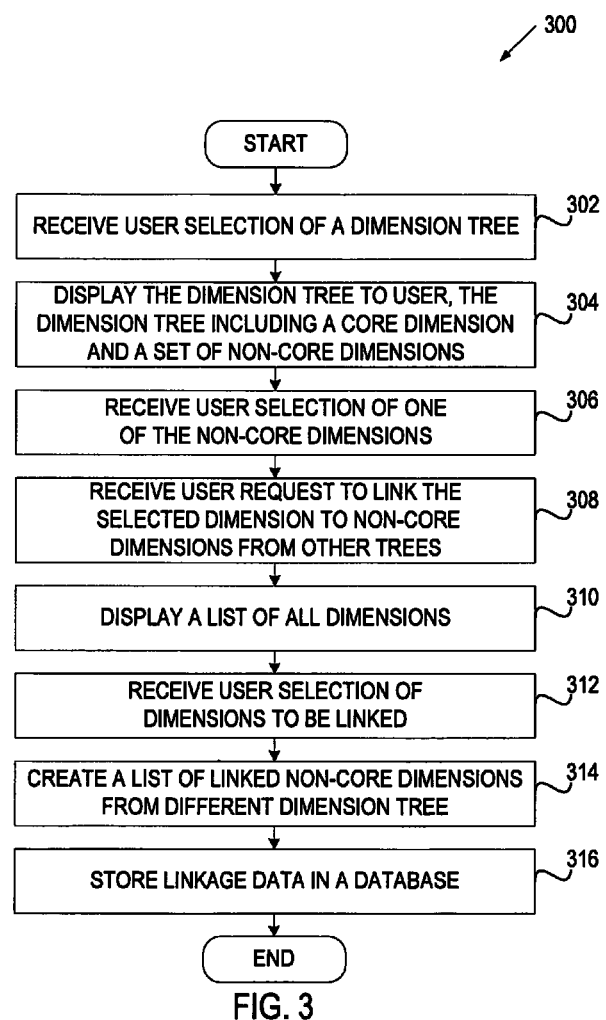
FIG. 3 illustrates a flow diagram of one embodiment of a method for linking non-core dimensions.

FIG. 3 illustrates a flow diagram of one embodiment of a method 300 for linking non-core dimensions from different dimension trees. The method 300 may be performed by processing logic that may comprise hardware (e.g., circuitry, dedicated logic, programmable logic, microcode, etc.), software (such as instructions run on a processing device), or a combination thereof. In one embodiment, the method 300 is performed by a DTF tool 106 of FIG. 1.

Referring to FIG. 3, method 300 begins with processing logic receiving user input identifying a dimension tree (block 302). The user input may be provided by a user selecting the dimension tree from a list of existing dimension trees or by a user entering the name of the dimension tree.

At block 304, processing logic displays the dimension tree to the user (e.g., the DBA). The dimension tree includes a core dimension and a set of non-core dimensions.

At block 306, processing logic receives a user selection of a non-core dimension from the set. At block 308, processing logic receives a user request to link the selected non-core dimension to dimensions from other dimension trees. For example, the user request may be received when the user right clicks on the selected dimension and chooses a link option from a list of options displayed in a popup window.

At block 310, processing logic displays a list of dimensions from all existing dimension trees, except the dimension tree being currently displayed to the user. At block 312, processing logic receives a user selection of one or more dimensions from the list. At block 314, processing logic creates a list of linked non-core dimensions that includes the original non-core dimension and non-core dimensions from other dimension trees that were selected by the user at block 312. At block 316, processing logic stores linkage data in a database (e.g., a non-core linkage table 228).

Figure 4:
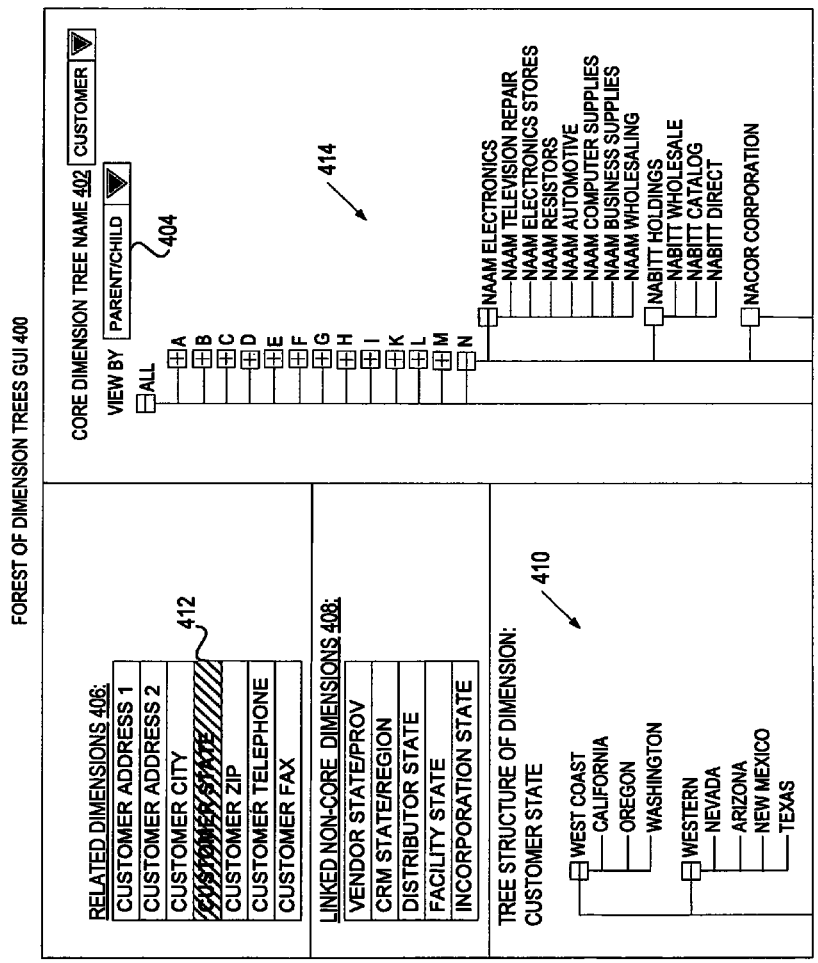
FIG. 4 illustrates an exemplary user interface showing management of forests of dimension trees, in accordance with one embodiment of the invention.

FIG. 4 illustrates an exemplary graphical user interface (GUI) 400 facilitating management of forests of dimension trees, in accordance with one embodiment of the invention. When a user specifies the name of a core dimension tree 402 and identifies a view 404 for this dimension tree, the GUI displays the dimension tree in area 414. In addition the GUI displays a list of non-core dimensions 406 related to the core dimension ("customer name") from the tree. Upon receiving a user selection of a non-core dimension 412, the GUI displays a list of linked non-core dimensions 408 from other dimension trees. In addition, the GUI displays a tree structure 410 for the selected dimension 412. Due to the linkage between the non-core dimensions 408 and the selected non-core dimension 412, the respective trees are combined into a forest of dimension trees.

In one embodiment, when the user selects a non-core dimension (e.g., by a right-click), the GUI 400 displays a list of options to be performed with respect to the selected dimension such as linking the selected dimension with dimensions from other dimension trees, performing a merge or transform with respect to the selected dimension, "unlink" the selected dimension from one or more previously linked dimensions, or create a custom view of the linked dimensions. Alternatively, if the user right-clicks anywhere on the screen without selecting a non-core dimension, the GUI 400 allows the user to invoke the ETL tool or the pyramid tool, or to close the current application.

Figure 5:
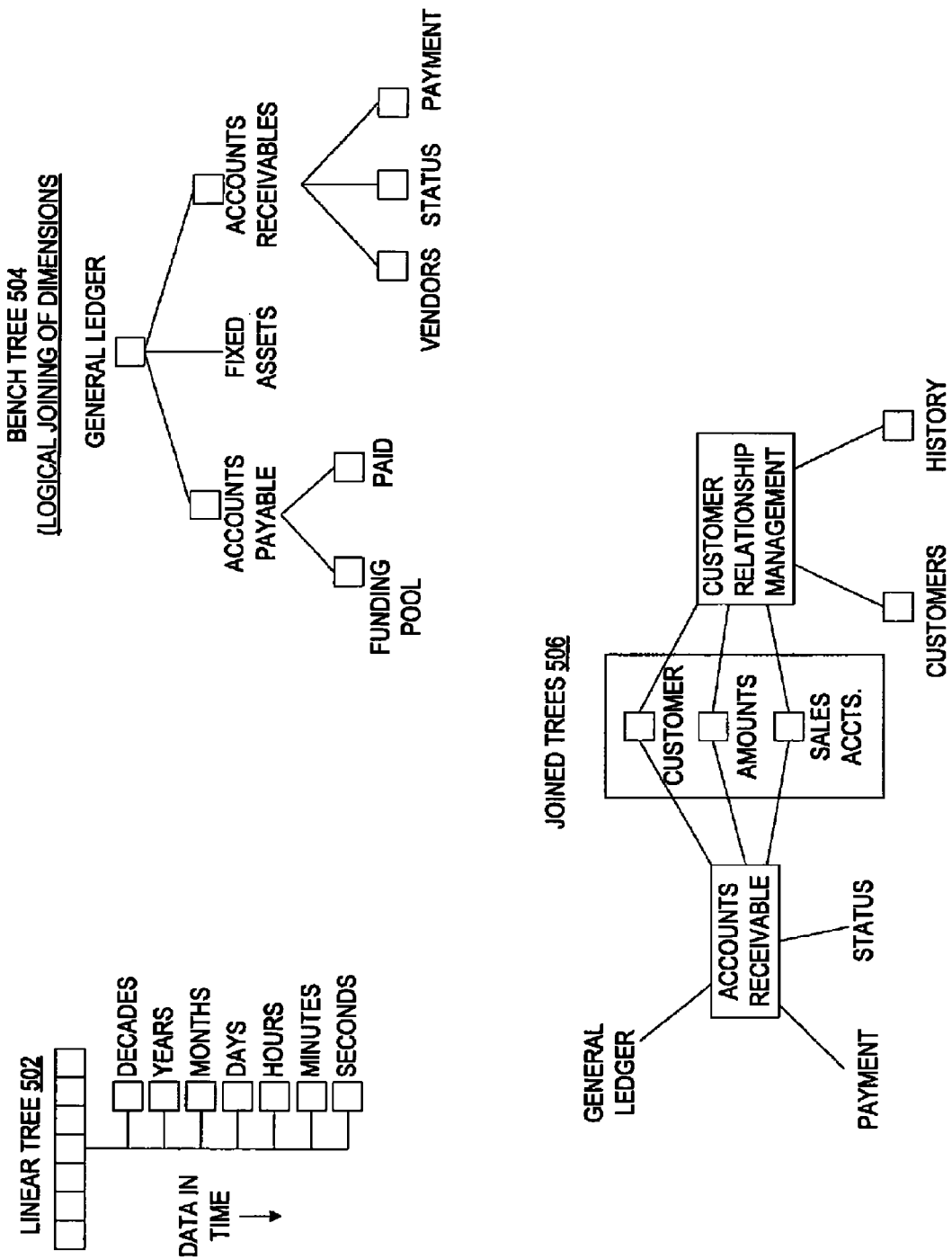
FIG. 5 illustrates exemplary types of forests of dimension trees, in accordance with one embodiment of the invention.

FIG. 5 illustrates exemplary types of forests of dimension trees, in accordance with one embodiment of the invention. Type 502 combines dimension trees using a linear tree model (lattice structure). Type 502 provides a way to break up large, undimensionalizable, yet logical data, into smaller dimensionalizable chinks.

Type 504 combines dimension trees using a branch tree model (logical joining of dimensions). Type 504 may be used when one dimension or dataset is a feeder into another dimension or dataset, yet each dimension is distinct enough to get its own treatment as a dimension with its own hierarchy.

Type 506 combines dimension trees using a joined trees model. Type 506 can be used when horizontal dimensions can be also merged or treated as a dimension tree. All elements do not have to be shared and can be logically ignored. In the illustrated example, cash paying customers are important to a sales system but are not applicable to a credit sales accounting system.

Figure 6:
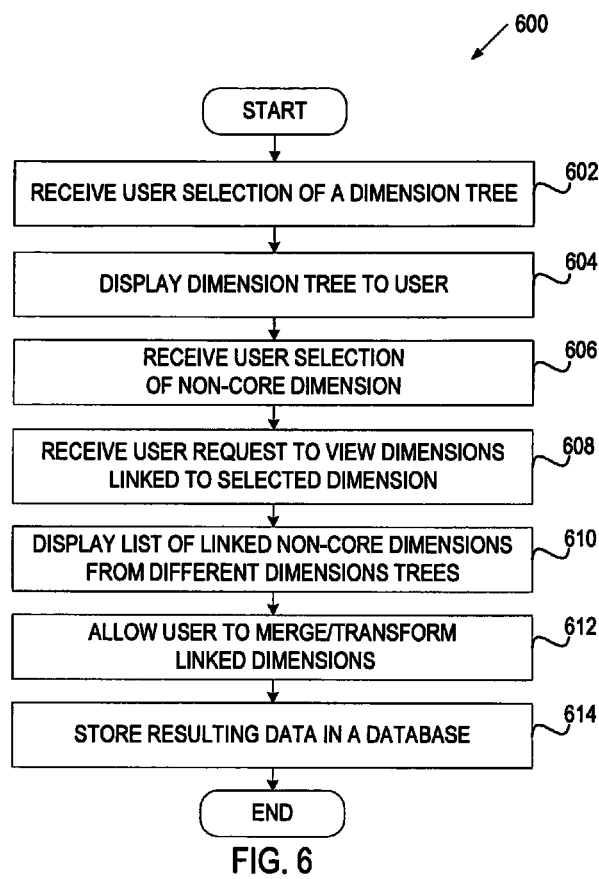
FIG. 6 illustrates a flow diagram of one embodiment of a method for manipulating linked non-core dimensions.

FIG. 6 illustrates a flow diagram of one embodiment of a method 600 for manipulating linked non-core dimensions. The method 600 may be performed by processing logic that may comprise hardware (e.g., circuitry, dedicated logic, programmable logic, microcode, etc.), software (such as instructions run on a processing device), or a combination thereof. In one embodiment, the method 600 is performed by a DTF tool 106 of FIG. 1.

Referring to FIG. 6, method 600 begins with processing logic receiving user input identifying a dimension tree (block 602). The user input may be provided by a user selection of the dimension tree from a list of existing dimension trees or by a user entering the name of the dimension tree.

At block 604, processing logic displays the dimension tree to the user (e.g., the DBA). The dimension tree includes a core dimension and a set of non-core dimensions.

At block 606, processing logic receives a user selection of a non-core dimension from the set. At block 608, processing logic receives a user request to view dimensions linked to the selected non-core dimension. For example, the user request may be received when the user right clicks on the selected dimension and chooses a "view linked" option from a list of options displayed in a popup window.

At block 610, processing logic displays a list of linked non-core dimensions from different dimension trees. At block 612, processing logic allows the user to merge/transform the linked dimensions (e.g., to create a hierarchy or tree of the linked dimensions). At block 614, processing logic stores the resulting mapping data in a database (e.g., a tree table 224).

Figure 7:
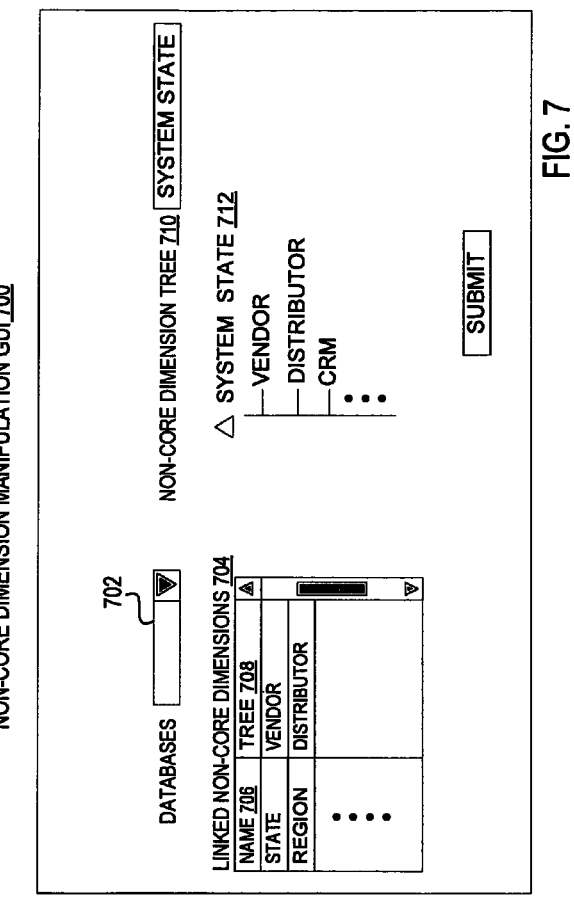
FIG. 7 illustrates an exemplary user interface facilitating transformation of linked non-core dimensions, in accordance with one embodiment of the invention.

FIG. 7 illustrates an exemplary non-core dimension manipulation GUI 700 facilitating transformation of linked non-core dimensions, in accordance with one embodiment of the invention. When a user selects a non-core dimension in GUI 400 of FIG. 4 and chooses a manipulation option, GUI 700 appears, displaying a list of linked non-core dimensions including the non-core dimension that was selected via GUI 400. GUI 700 displays names 706 of linked non-core dimensions and names 708 of respective dimension tress. GUI 700 then allows the user to create a tree or view of non-core dimensions 704 by specifying the name 710 of new tree 712 and adding dimensions 704 to the new tree 712 using a desired hierarchical structure.

Figure 8:
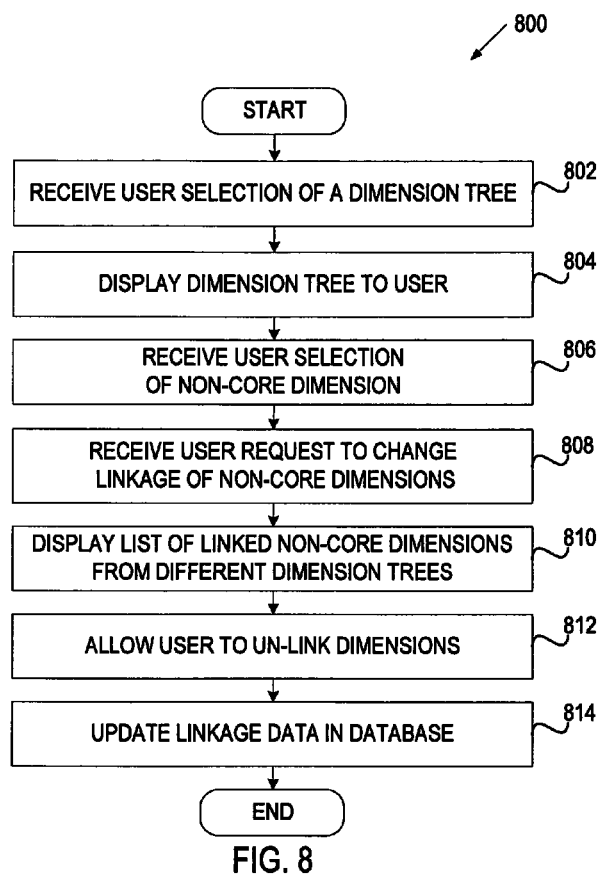
FIG. 8 illustrates a flow diagram of one embodiment of a method for modifying linkage of non-core dimensions.

FIG. 8 illustrates a flow diagram of one embodiment of a method 800 for modifying linkage of non-core dimensions. The method 800 may be performed by processing logic that may comprise hardware (e.g., circuitry, dedicated logic, programmable logic, microcode, etc.), software (such as instructions run on a processing device), or a combination thereof. In one embodiment, the method 800 is performed by a DTF tool 106 of FIG. 1.

Referring to FIG. 8, method 800 begins with processing logic receiving user input identifying a dimension tree (block 802). The user input may be provided by a user selection of the dimension tree from a list of existing dimension trees or by a user entering the name of the dimension tree.

At block 804, processing logic displays the dimension tree to the user (e.g., the DBA). The dimension tree includes a core dimension and a set of non-core dimensions.

At block 806, processing logic receives a user selection of a non-core dimension from the set. At block 808, processing logic receives a user request to change linkage for the selected non-core dimension. For example, the user request may be received when the user right clicks on the selected dimension and chooses a "change linkage" option from a list of options displayed in a popup window.

At block 810, processing logic displays a list of linked non-core dimensions from different dimension trees. At block 812, processing logic allows the user to un-link some or all of the linked dimensions. At block 814, processing logic updates relevant linkage data in a database (e.g., a non-core linkage table 228).

Figure 9:
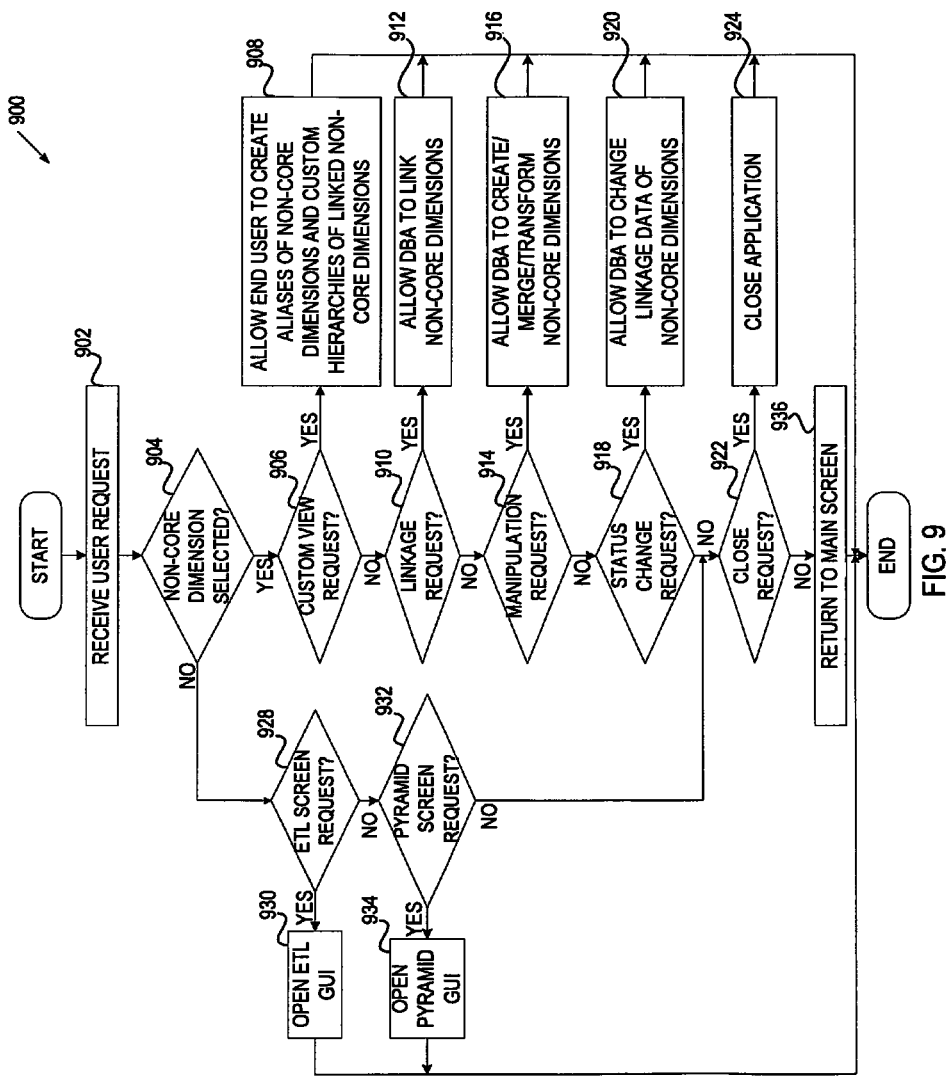
FIG. 9 illustrates a flow diagram of one embodiment of a method for managing forests of dimension trees.

FIG. 9 illustrates a flow diagram of one embodiment of a method 900 for managing forests of dimension trees. The method 900 may be performed by processing logic that may comprise hardware (e.g., circuitry, dedicated logic, programmable logic, microcode, etc.), software (such as instructions run on a processing device), or a combination thereof. In one embodiment, the method 900 is performed by a DTF tool 106 of FIG. 1.

Referring to FIG. 9, method 900 begins with processing logic receiving a user request to perform one of several options (block 902). In response, processing logic determines whether the user request is associated with a selected non-core dimension (block 904). If so, processing logic determines whether the user request is to create a custom view (block 906). If so, processing logic presents a GUI allowing the user to create aliases for non-core dimensions and to build a custom hierarchy of linked non-core dimensions for this specific user (block 908).

If the determination at block 906 is negative, processing logic determines whether the user request is to link non-core dimensions from different dimensions trees (block 910). If so, processing logic presents a GUI allowing the user to link non-core dimensions (block 912).

If the determination at block 912 is negative, processing logic determines whether the user request is to merge/transform non-core dimensions (block 914). If so, processing logic allows the user to merge/transform the linked non-core dimensions (block 916). If not, processing logic further determines whether the user request is to change linkage of non-core dimensions (block 920). If it is a linkage request, processing logic allows the user to "unlink" at least some of the non-core dimensions (block 920). If it is not a linkage request, processing logic determines whether the user request is a close application request (block 922). If so, processing logic closes the application (block 924). If not, processing logic returns to the main screen (block 936).

If the determination at block 904 is negative, processing logic determines whether the user request is to invoke the ETL tool (block 928). If so, processing logic opens the ETL GUI (block 930). If not, processing logic further determines whether the user request is to invoke the pyramid tool (block 932). If it is such a request, processing logic opens the pyramid tool GUI (block 934). Alternatively, processing logic proceeds to block 922.

Figure 10:
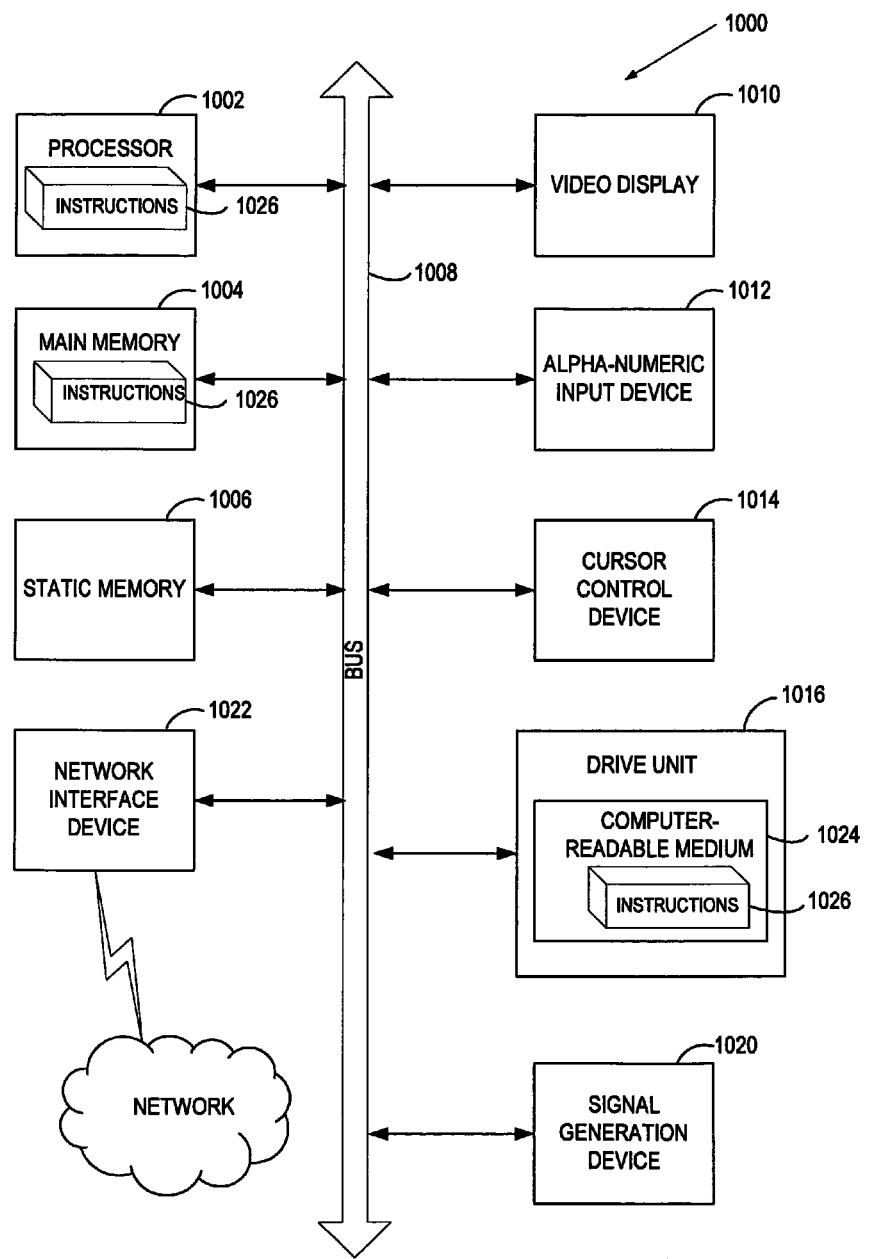
FIG. 10 illustrates a block diagram of an exemplary computer system implementing some embodiments of the present invention.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The secondary memory 1018 may include a machine-readable storage medium (or more specifically a computer-readable storage medium) 1031 on which is stored one or more sets of instructions (e.g., software 1022) embodying any one or more of the methodologies or functions described herein. The software 1022 may also reside, completely or at least partially, within the main memory 1004 and/or within the processing device 1002 during execution thereof by the computer system 1000, the main memory 1004 and the processing device 1002 also constituting machine-readable storage media. The software 1022 may further be transmitted or received over a network 1020 via the network interface device 1008.

The machine-readable storage medium 1031 may also be used to store dimension tree mapping data (e.g., dimension tree database 108 or 208 of FIGS. 1 and 2). While the machine-readable storage medium 1031 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
   receiving user input identifying a dimension tree of a plurality of dimension trees associated with a master database;
   presenting, in a user interface, the dimension tree to the user, the dimension tree including a core dimension indicating a purpose of the dimension tree, the user interface displaying a plurality of non-core dimensions characterizing the core dimension;
   receiving, via the user interface, user input identifying one of the plurality of non-core dimensions of the dimension tree, and presenting, via the user interface, a plurality of options to be performed with respect to the identified non-core dimension of the dimension tree;
   receiving a user selection of a link option from the plurality of options, the link request option to link the dimension tree to other dimensions trees of the plurality of dimension trees via the identified non-core dimension of the dimension tree;
   in response to the user selection of the link option, displaying, in the user interface, a list of available dimensions from the other dimension trees, the available dimensions comprising non-core dimensions from the other dimension trees; and receiving, via the user interface, a user selection of non-core dimensions from the list of available dimensions, wherein the master database does not define a relationship between the identified non-core dimension from the dimension tree and any of the selected non-core dimensions from the other dimension trees;
   creating, by a processing device, a list of linked non-core dimensions from the plurality of dimension trees using the identified non-core dimension from the dimension tree and the selected non-core dimensions from the other dimension trees, the list associating the linked non-core dimensions from the plurality of dimension trees with each other to combine the plurality of dimension trees into a forest of dimension trees;
   storing data identifying the linked non-core dimensions in a reporting database; and
   presenting, in the user interface, the forest of dimension trees based on associations between the linked non-core dimensions.

2. The method of claim 1 further comprising:
   presenting the linked non-core dimensions from the plurality of dimension trees to the user.

3. The method of claim 1 further comprising:
   receiving a user request to create a dimension tree including at least a subset of the linked non-core dimensions;
   receiving user input specifying the dimension tree including at least the subset of the linked non-core dimensions; and
   storing the user input in the database.

4. The method of claim 1 further comprising:
   receiving a user request to link at least one new non-core dimension to the selected non-core dimension;
   creating the new non-core dimension based on user input;
   storing the new non-core dimension in the database; and
   storing data identifying linkage of the new non-core dimension to the selected non-core dimension in the database.

5. The method of claim 1 further comprising:
   receiving a user request to modify linkage between non-core dimensions;
   receiving user input specifying a change in the linkage between the non-core dimensions; and
   updating corresponding linkage information in the database based on the user input.

6. The method of claim 1 further comprising:
   receiving a custom view request of a second user regarding the selected non-core dimension;
   allowing the second user to create a custom view of the linked non-core dimensions; and
   storing data identifying the custom view in the database for access by the second user.

7. The method of claim 6 wherein the user is a database administrator, the second user is an end user, and the custom view is created only for use by the second user.

8. The method of claim 6 further comprising:
   allowing the second user to create an alias for any of the linked non-core dimensions, the alias to be used by the second user.

9. A system comprising:
   a memory;
   a processing device, coupled to the memory;
   a non-core dimension manager, executed from the memory by the processing device, to receive user input identifying a dimension tree of a plurality of dimension trees associated with a master database, to present, in a user interface, the dimension tree to the user, the dimension tree including a core dimension indicating a purpose of the dimension tree, the user interface displaying a plurality of non-core dimensions characterizing the core dimension,
  to receive, via the user interface, user input identifying one of the plurality of non-core dimensions of the dimension tree, and to present, via the user interface, a plurality of options to be performed with respect to the identified non-core dimension of the dimension tree,
  to receive a user selection of a link option from the plurality of options, the link option to link the dimension tree to other dimensions trees of the plurality of dimension trees via the identified non-core dimension of the dimension tree,
  in response to the user selection of the link option, to display, in the user interface, a list of available dimensions from the other dimension trees, the available dimensions comprising non-core dimensions from the other dimension trees, and to receive, via the user interface, a user selection of non-core dimensions from the list of available dimensions, wherein the master database does not define a relationship between the identified non-core dimension from the dimension tree and any of the selected non-core dimensions from the other dimension trees, and
  to create a list of linked non-core dimensions from the plurality of dimension trees using the identified non-core dimension from the dimension tree and the selected non-core dimensions from the other dimension trees, the list associating the linked non-core dimensions from the plurality of dimension trees with each other to combine the plurality of dimension trees into a forest of dimension trees; and
 a reporting database, coupled with the non-core dimension manager to store data identifying the linked non-core dimensions for a subsequent presentation of the forest of dimension trees based on associations between the linked non-core dimensions.

10. The system of claim 9 further comprising the user interface to present the linked non-core dimensions from the plurality of dimension trees to the user.

11. The system of claim 9 wherein the non-core dimension manager is further to receive a user request to create a dimension tree including at least a subset of the linked non-core dimensions, to receive user input specifying the dimension tree including at least the subset of the linked non-core dimensions, and to store the user input in the database.

12. The system of claim 9 wherein the non-core dimension manager is further to receive a user request to link at least one new non-core dimension to the selected non-core dimension, to create the new non-core dimension based on user input, to store the new non-core dimension in the database, and to store data identifying linkage of the new non-core dimension to the selected non-core dimension in the database.

13. The system of claim 9 wherein the non-core dimension manager is further to receive a user request to modify linkage between non-core dimensions, to receive user input specifying a change in the linkage between the non-core dimensions, and to update corresponding linkage information in the database based on the user input.

14. The system of claim 9 wherein the non-core dimension manager is further to receive a custom view request of a second user regarding the selected non-core dimension, to allow the second user to create a custom view of the linked non-core dimensions, and to store data identifying the custom view in the database for access by the second user.

15. The system of claim 14 wherein the user is a database administrator, the second user is an end user, and the custom view is created only for use by the second user.

16. The system of claim 9 wherein the non-core dimension manager is further to allow the second user to create an alias for any of the linked non-core dimensions, the alias to be used by the second user.

17. A non-transitory computer readable storage medium including instructions that, when executed by a processing system, cause the processing system to perform a method comprising:
  receiving user input identifying a dimension tree of a plurality of dimension trees associated with a master database;
  presenting, in a user interface, the dimension tree to the user, the dimension tree including a core dimension indicating a purpose of the dimension tree, the user interface displaying a plurality of non-core dimensions characterizing the core dimension;
  receiving, via the user interface, user input identifying one of the plurality of non-core dimensions of the dimension tree, and presenting, via the user interface, a plurality of options to be performed with respect to the identified non-core dimension of the dimension tree;
  receiving a user selection of a link option from the plurality of options, the link option to link the dimension tree to other dimensions trees of the plurality of dimension trees via the identified non-core dimension of the dimension tree;
  in response to the user selection of the link option, displaying, in the user interface, a list of available dimensions from the other dimension trees, the available dimensions comprising non-core dimensions from the other dimension trees; and receiving, via the user interface, a user selection of non-core dimensions from the list of available dimensions, wherein the master database does not define a relationship between the identified non-core dimension from the dimension tree and any of the selected non-core dimensions from the other dimension trees;
  creating, by the processing system, a list of linked non-core dimensions from the plurality of dimension trees using the identified non-core dimension from the dimension tree and the selected non-core dimensions from the other dimension trees, the list associating the linked non-core dimensions from the plurality of dimension trees with each other to combine the plurality of dimension trees into a forest of dimension trees;
  storing data identifying the linked non-core dimensions in a reporting database; and
  presenting, in the user interface, the forest of dimension trees based on associations between the linked non-core dimensions.

18. The computer readable storage medium of claim 17 wherein the method further comprises:
  receiving a user request to create a dimension tree including at least a subset of the linked non-core dimensions;
  receiving user input specifying the dimension tree including at least the subset of the linked non-core dimensions; and
  storing the user input in the database.

19. The computer readable storage medium of claim 17 wherein the method further comprises:
  receiving a user request to link at least one new non-core dimension to the selected non-core dimension;
  creating the new non-core dimension based on user input;
  storing the new non-core dimension in the database; and storing data identifying linkage of the new non-core dimension to the selected non-core dimension in the database.

20. The computer readable storage medium of claim 17 wherein the method further comprises:
   receiving a user request to modify linkage between non-core dimensions;
   receiving user input specifying a change in the linkage between the non-core dimensions; and
   updating corresponding linkage information in the database based on the user input.

* * * * *